United States Patent [19]

Hattori et al.

[11] 4,085,714
[45] Apr. 25, 1978

[54] ELECTRONIC IGNITION TIMING ADJUSTING SYSTEM FOR INTERNAL COMBUSTION ENGINE

[75] Inventors: Tadashi Hattori; Minoru Nishida; Yoshiki Ueno, all of Okazaki, Japan

[73] Assignee: Nippon Soken, Inc., Nishio, Japan

[21] Appl. No.: 670,108

[22] Filed: Mar. 25, 1976

[30] Foreign Application Priority Data

Apr. 14, 1975 Japan .................................. 50-45684

[51] Int. Cl.$^2$ ................................................ F02P 5/04
[52] U.S. Cl. ................................................ 123/117 R
[58] Field of Search ........ 123/117 R, 117 D, 146.5 A

[56] References Cited

U.S. PATENT DOCUMENTS

| | | | |
|---|---|---|---|
| 3,705,573 | 12/1972 | Palazzetti | 123/117 R |
| 3,888,220 | 6/1975 | Bigalke | 123/117 R |
| 3,890,944 | 6/1975 | Werner | 123/117 R |
| 3,916,855 | 11/1975 | Fauser | 123/117 R |
| 3,935,845 | 2/1976 | Aono | 123/117 R |
| 3,939,811 | 2/1976 | Sasayama | 123/117 R |

*Primary Examiner*—Ronald B. Cox
*Attorney, Agent, or Firm*—Cushman, Darby & Cushman

[57] ABSTRACT

An electronic ignition timing adjusting system for an internal combustion engine designed to adjust the ignition timing of the engine through a wide range of speeds from the lower to higher engine rotational speeds. The point at which the crankshaft reaches a predetermined angular position and the point at which a capacitor which starts charging in relation to another angular position of the crankshaft discharges the voltage thereacross to a predetermined value are initially set. Of these two points, that which occurs earlier than the other is selected as the desired ignition point or timing and in this way constant and stable ignition timing is provided at the lower engine rotational speeds, while the ignition timing at the higher engine rotational speeds is adjusted with a high degree of accuracy, thereby providing on the whole the satisfactory ignition timing which follows up or response excellently to changes in the engine rotational speed.

6 Claims, 14 Drawing Figures

ELECTRONIC IGNITION TIMING ADJUSTING SYSTEM FOR INTERNAL COMBUSTION ENGINE

The present invention relates to an electronic ignition timing adjusting system for an internal combustion engine, and more particularly the invention relates to a system capable of providing constant and stable ignition timing in the lower rotational speed ranges of an internal combustion engine and also capable of adjusting the ignition timing with improved accuracy in the higher rotational speed ranges.

Figure 1A:
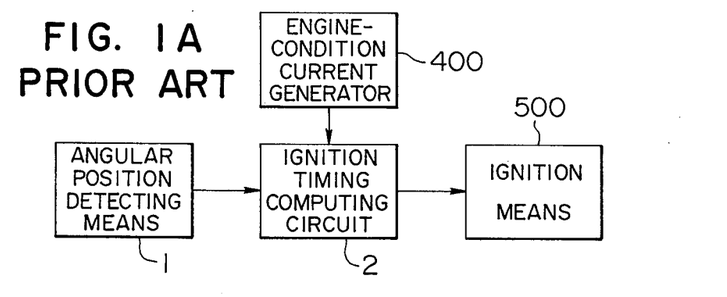
FIGS. 1A and 1B are respectively a block diagram showing a conventional system and a time chart for explaining the operation of the conventional system.
Figure 1B:
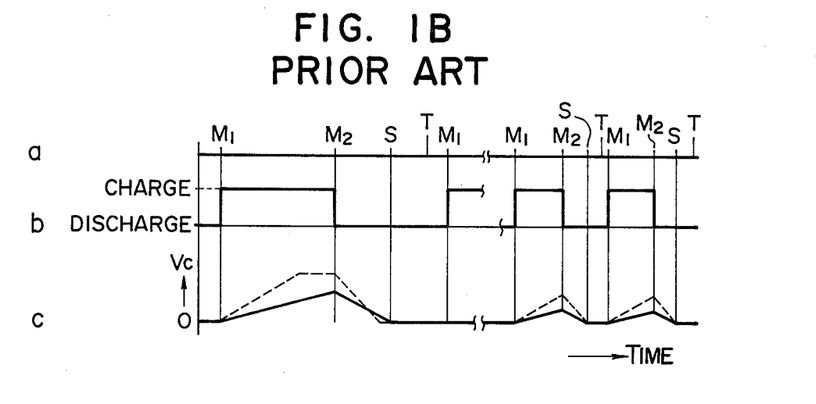

Referring now to FIGS. 1A and 1B, there are illustrated a block diagram of the conventional system disclosed in the Japanese Patent Application Laid-open No. 92430/1974 and a time chart for explaining the operating principle of this conventional system. In FIG. 1A, numeral 1 designates angular position detecting means for detecting the angular positions of the crankshaft of an internal combustion engine, 2 an ignition timing computing circuit, 400 an engine-condition current generator connected to sensors (not shown) for detecting the operating conditions of the engine to receive the electric output signals of the sensors to supply a current corresponding to the operating conditions of the engine, 500 ignition means for igniting the engine according to the ignition timing determined by the ignition timing computing circuit 2. On the time base $a$ in FIG. 1B, symbols $M_1$ and $M_2$ designate two different angular positions of the crankshaft, T the top dead center, S the ignition position. The operation of this conventional system is as follows. The angular position detecting means 1 detects the two rotational angular positions $M_1$ and $M_2$ of the crankshaft. On the other hand, the ignition timing computing circuit 2 includes a capacitor which is not shown, so that the capacitor starts charging with a constant current at the position $M_1$ and at the position $M_2$ the capacitor stops charging and simultaneously starts discharging with a constant current thus completing the discharge at the point S which in turn is used as the ignition point or timing. In this case, the terminal voltage of the capacitor changes as shown by the charging and discharging curve C in FIG. 1B. In other words, when the charging current and the discharging current of the capacitor are maintained constant, the ignition timing is held constant in relation to the angular position of the crankshaft independently of the engine rotational speeds, and the discharging current of the capacitor may be changed through the engine-condition current generator 400 in accordance with the conditions of the engine to adjust the ignition timing to suit the conditions of the engine. In FIG. 1B, $b$ indicates the charging and discharging conditions of the capacitor.

A disadvantage of the above-described conventional system is that where the rotational speed of an internal combustion engine varies rapidly as in the case of a four-cylinder, four-cycle engine, the rotational speed of the engine varies at a ratio of about 1 : 30 from about 200 rpm when the engine is being cranked for starting to a high rotational speed of about 6000 rpm and the charging time of the capacitor (the time period between the angular positions $M_1$ and $M_2$) also varies at a ratio of about 30 : 1 causing the terminal voltage $V_c$ of the capacitor (the curve $c$ in FIG. 1B) to vary similarly at a ratio of about 30 : 1. Consequently, if the charging current at the lower engine speeds is selected small, the terminal voltage $V_c$ of the capacitor at the higher engine speeds is reduced with the result that the accuracy of the ignition timing determined by detecting the time of the termination of the discharging of the capacitor is considerably deteriorated as compared with that obtained at the lower engine speeds. Another disadvantage is that if the charging current of the capacitor is selected sufficiently large to increase the terminal voltage of the $V_c$ of the capacitor and thereby to ensure the desired accuracy of the ignition timing at the higher engine speeds, the terminal voltage of the capacitor is saturated at the lower engine speeds as shown by the broken line in FIG. 1B making it impossible to obtain the desired ignition timing.

On the other hand, at the lower speed operation of an internal combustion engine the operating condition (power output) of the engine is practically unaffected even if the ignition timing is maintained constant for variations in the rotational speed of engine. Thus, by initially setting for angular position detecting means the point of generating a first detection signal in response to a predetermined angular position of the crankshaft and the point of generating a second detection signal in response to the discharging of the voltage on a capacitor to a predetermined value and using one of these two points which occurs earlier than the other as the desired ignition point or timing, namely, by using the former point as the ignition timing of the engine at the lower rotational speeds and using the latter point as the ignition time of the engine under other operating conditions than the lower speed engine operation, it is possible to obtain the constant and stable ignition timing at the lower rotational speeds of the engine, whereas at the higher rotational speeds of the engine the ignition timing is adjusted with improved accuracy, thus providing the ignition timing which on the whole excellently follows up or responds to variations in the rotational speed of the engine.

In view of the above-mentioned fact, it is an object of this invention to provide an electronic ignition timing adjusting system for an internal combustion engine which is capable of smoothly adjusting the ignition timing through a wide range of speed from the lower to higher rotational speeds of the engine.

It is another object of this invention to provide an electronic ignition timing adjusting system for an internal combustion engine wherein the rotational angular positions of the engine at which a capacitor is charged and discharged, respectively, and the ignition timing at the lower rotational speeds of the engine may be set to any desired values independently.

The above object is accomplished by an arrangement wherein angular position detecting means detects first, second and third different rotational angular positions of the engine to sequentially generate the corresponding first, second and third detection signals, whereby the capacitor is charged in response to the first detection signal and discharged in response to the second detection signal and the time of occurrence of the third detection signal is selected as the desired ignition timing at the lower engine rotational speeds.

It is still another object of this invention to provide an electronic ignition timing adjusting system for an internal combustion engine which is capable of adjusting the ignition timing with improved accuracy with a simple construction.

The above object is accomplished by an arrangement wherein angular position detecting means detects first and second different rotational angular positions of the engine to generate the corresponding first and second detection signals in this order, whereby the capacitor is charged in response to the first detection signal and discharged in response to the second detection signal and the time of occurrence of the next first detection signal is concurrently used as the desired ignition timing at the lower engine rotational speeds.

The system of this invention has among its great advantages the fact that it is capable of providing constant and stable ignition timing at the lower engine rotational speeds and adjusting the ignition timing with the maximum possible accuracy at the higher engine rotational speeds.

The present invention will now be described in greater detail with reference to the illustrated embodiments.

Figure 2:
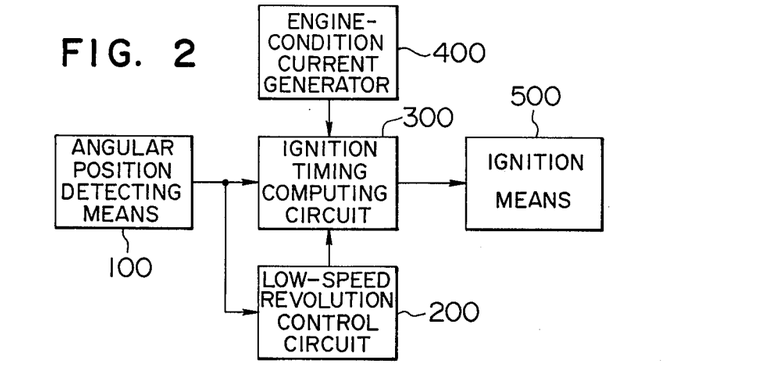
FIG. 2 is a block diagram showing a first embodiment of a system according to this invention.

Referring first to FIG. 2 showing a first embodiment of this invention, numeral 100 designates angular position detecting means for detecting three different angular positions of the crankshaft of a four-cylinder, four-cycle internal combustion engine, 200 a low-speed revolution control circuit for selecting as the desired ignition timing for the low speed operation of the engine the point of occurrence of one of the output signals from the angular position detecting means 100, 300 an ignition timing computing circuit for adjusting the ignition timing by a capacitor charging and discharging method, 400 an engine-condition current generator connected to sensors (not shown) for detecting the operating conditions of the engine to supply a current corresponding to the operating conditions of the engine in accordance with the electric signals from the sensors, 500 a known type of ignition means for igniting the engine with the output signal of the ignition timing computing circuit 300.

Figure 3:
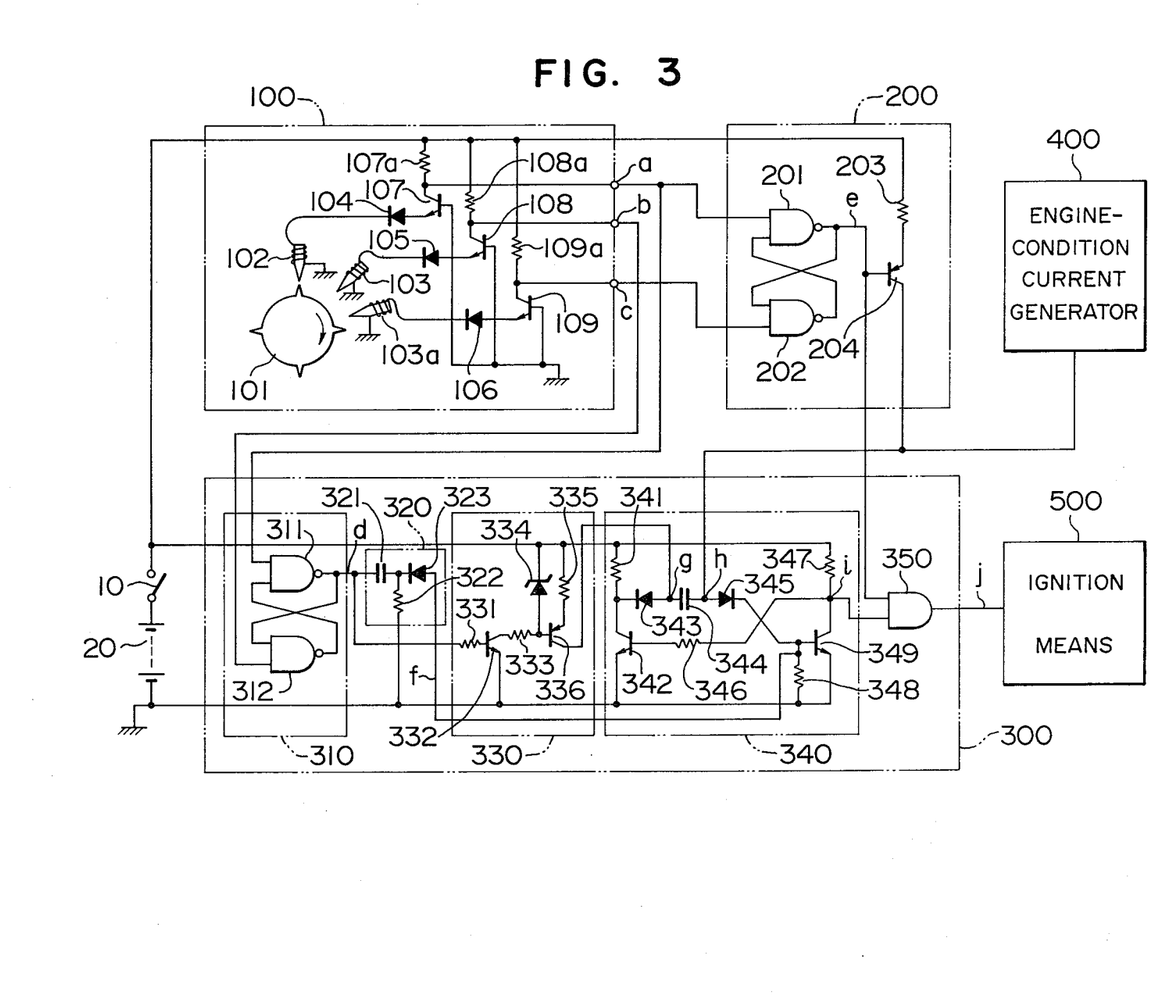
FIG. 3 is a wiring diagram of the first embodiment of the system according to this invention.
Figure 4A:
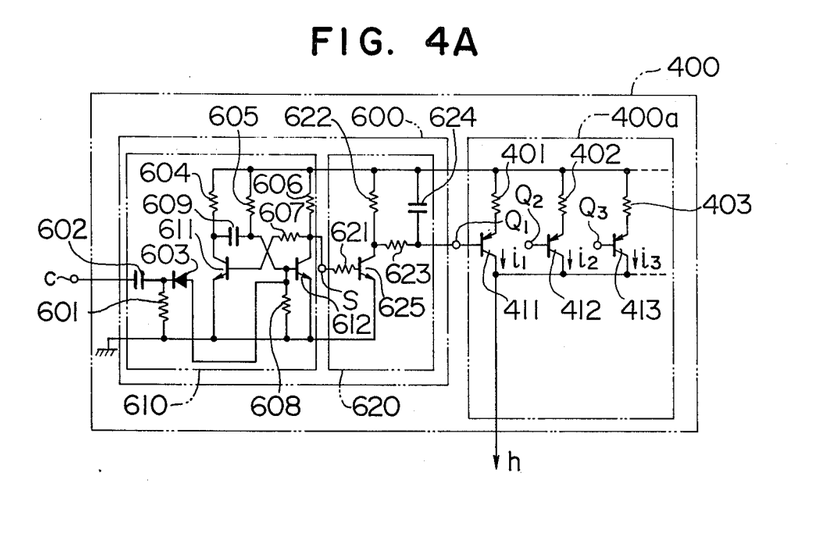
FIG. 4A is a wiring diagram showing an embodiment of the engine-condition current generator used in the system of this invention shown in FIG. 3.
Figure 4B:
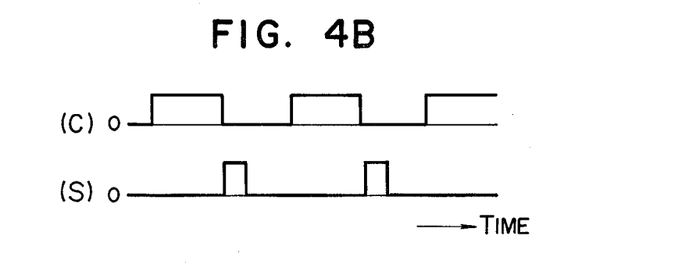
FIGS. 4B, 4C and 4D are a signal waveform diagram and output characteristic diagrams useful for explaining the operation of the engine-condition current generator shown in FIG. 4A.
Figure 4C:
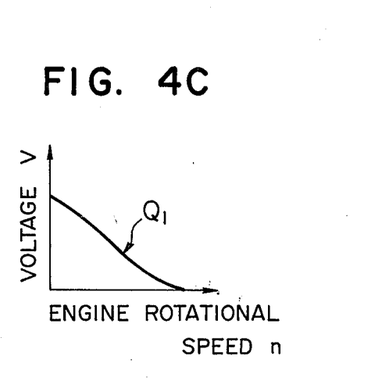
Figure 4D:
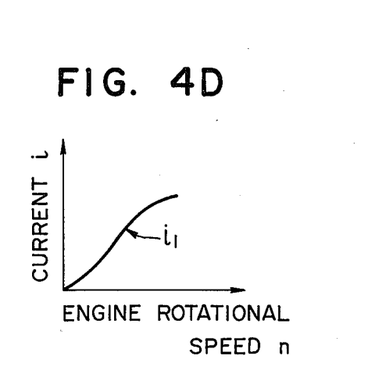

With the construction described above, the detailed circuits in the system of this invention will now be described with reference to FIG. 3. In the angular position detecting means 100, numeral 101 designates a rotor having four projections arranged on its outer periphery at equal intervals and mounted fixedly on the distributor shaft of the engine which is not shown for rotation therewith. Numerals 102, 103 and 103a designate first, second and third electromagnetic pickups arranged adjacent to the outer periphery of the rotor 101 with a predetermined angular displacement therebetween to face the projections on the rotor 101. Numerals 104, 105 and 106 designate diodes respectively connected to the electromagnetic pickups 102, 103 and 103a, 107a, 180a and 109a resistors, 107, 108 and 109 transistors having their collectors respectively connected to the resistors 107a, 108a and 109a, their emitters respectively connected to the pickups 102, 103 and 103a and their bases connected to the ground. In the low-speed revolution control circuit 200, numerals 201 and 202 designate NAND circuits constituting a flip-flop circuit having its one input connected to the collector of the transistor 107 and the other input connected to the collector of the transistor 109. Numeral 203 designates a resistor, 204 a PNP transistor having its emitter connected to the resistor 203 and its base connected to the output side of the NAND circuit 201. In the ignition timing computing circuit 300, numeral 310 designates a flip-flop circuit comprising NAND circuits 311 and 312 and having its one input connected to the collector of the transistor 107 and the other input connected to the collector of the transistor 108. Numeral 320 designates a trigger signal generating circuit comprising a capacitor 321, a resistor 322 and a diode 323 to generate a differentiated trigger output from the output of the flip-flop circuit 310. Numeral 330 designates a constant current circuit comprising resistors 331, 333 and 335, transistors 332 and 336 and a Zener diode 334 with the base of the transistor 332 connected to the output side of the flip-flop circuit 310 through the resistor 331 and constituting a charging current control circuit. Numeral 340 designates a monostable multivibrator circuit comprising resistors 341, 346, 347 and 348, transistors 342 and 349, diodes 343 and 345 and a capacitor 344 having its one end connected to the output side of the constant current circuit 330 and its other end connected to the collector of the transistor 204 in the low-speed revolution control circuit 200 and the engine-condition current generator 400. Numeral 350 designates an AND circuit which receives as its inputs the output of the monostable multivibrator circuit 340 and the output of the flip-flop in the low-speed revolution control circuit 200. Numeral 10 designates a key switch, 20 a battery. The low-speed revolution control circuit 200, the flip-flop circuit 310, the trigger signal generating circuit 320, the monostable multivibrator circuit 340 and the AND circuit 350 constitute an ignition timing selection circuit. The engine-condition current generator 400 constituting a discharging current control circuit may for example be constructed as shown in FIG. 4A. In the Figure, numeral 400a designates a current generating circuit comprising PNP transistors 411, 412 and 413 connected in parallel with one another to respectively receive at the bases thereof voltages $Q_1$, $Q_2$ and $Q_3$ corresponding to the parameters of the engine such as the rotational speed, intake manifold vacuum and so on and resistors 401, 402 and 403 respectively connected between the emitters of the transistors 411, 412 and 413 and the key switch 10 shown in FIG. 3, and the collectors of the transistors 411, 412 and 413 are connected to the juncture of the capacitor 344 and the diode 345 in the monostable multivibrator circuit 340 shown in FIG. 3. Numeral 600 designates by way of example a rotational speed detecting circuit for detecting the rotational speed of the engine which is one of the previously mentioned parameters and the circuit comprises a monostable multivibrator circuit 610 and an integrating circuit 620. The monostable multivibrator circuit 610 comprises a differentiation circuit portion including a resistor 601, a capacitor 602 and a diode 603 and a monostable circuit portion including resistors 604, 605, 606, 607 and 608, a capacitor 609 and transistors 611 and 612. A rotational speed signal having the waveform shown by (C) in FIG. 4B is applied to one end of the resistor 601. The required rotational speed sensor for generating this rotational speed signal may comprise for example an electromagnetic pickup (e.g., a pickup of the same type as the electromagnetic pickups 102, 103 and 103a shown in FIG. 3) which is arranged to face the teeth of a flywheel gear mounted directly on the engine crankshaft and meshed with the pinion of the starter and a waveform shaping circuit for reshaping the output of the electromagnetic pickup into a rectangular waveform. The integrating circuit 620 comprises 621, 622 and 633, a capacitor 624 and a transistor 625. With this rotational speed detecting circuit 600, when a rotational speed signal C such as shown by (C) in FIG. 4B and corresponding to the rotational speed of the engine is applied to the monostable multivibrator circuit 610, a monostable signal S corresponding to the engine rotational speed and having a fixed pulse width as shown by (S) in FIG. 4B is generated at the output of the monostable multivibrator circuit 610. When this monostable multivibrator output corresponding to the engine rotational speed is applied to the integrating circuit 620, an output voltage $Q_1$ inversely proportional to the engine rotational speed as shown in FIG. 4C is generated from the integrating circuit 620. This output voltage $Q_1$ is applied to the base of the transistor 411 in the current generating cir circuit 400a so that a current $i_1$ approximately directly proportional to the engine rotational speed as shown in FIG. 4D flows to the collector of the transistor 411. Since the voltages $Q_2$ and $Q_3$ corresponding to other engine parameters such as the intake manifold vacuum, etc., are applied to the bases of other transistors 412 and 413 of the current generating circuit 400a, the current generating circuit 400a in effect generates a current corresponding to the engine parameters.

Figure 5:
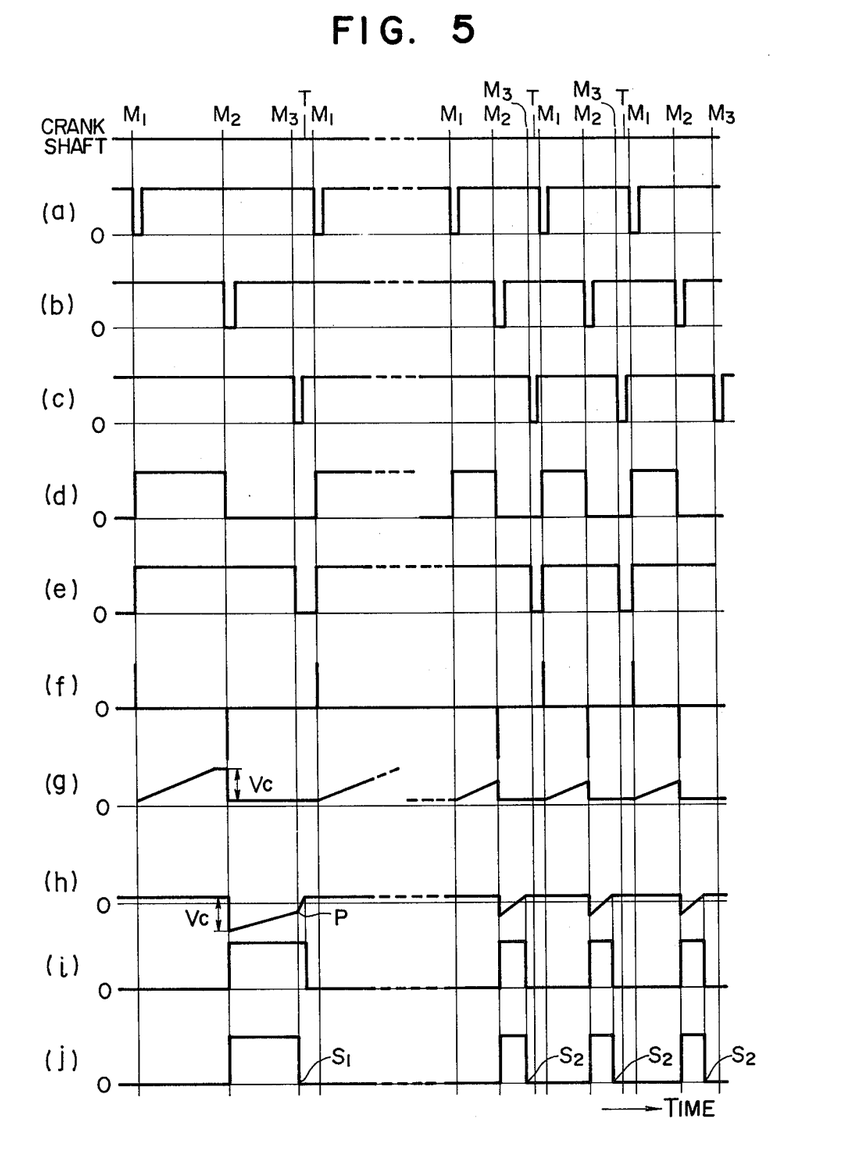
FIG. 5 is a signal waveform diagram useful for explaining the operation of the system of this invention shown in FIG. 3.

With the detailed construction described above, the operation of the system of this invention will now be described with reference to the signal waveforms shown in FIG. 5. The rotor 101 is rotated in the direction of an arrow in FIG. 3 in synchronism with the rotation of the crankshaft so that each time any projection of the rotor 101 passes through the electromagnetic pickups 102, 103 and 103a, respectively, each of the electromagnetic pickups 102, 103 and 103a generates a signal which goes from positive to negative. Consequently, the electromagnetic pickups 102, 103 and 103a respectively detect the first, second and third rotational angular positions $M_1$, $M_2$ and $M_3$ of the crankshaft. Since the base of the transistor 107 is grounded, when the electromagnetic pickup 102 generates a positive output, the transistor 107 is turned off and thus a "1" level signal is generated at the collector of the transistor 107 as shown by (a) in FIG. 5, whereas when the electromagnetic pickup 102 generates a negative output the transistor 107 is turned on and thus a "0" level signal is generated at the collector of the transistor 107 as shown by (a) in FIG. 5. The transistors 108 and 109 operate in the similar manner so that the transistors 107, 108 and 109 generate at the collectors thereof signals which respectively go from the "1" to "0" level at the three different angular positions $M_1$, $M_2$ and $M_3$ of the crankshaft as shown by (a), (b) and (c) in FIG. 5. The collector signals of the transistors 107 and 109 are applied to the flip-flop circuit comprising the NAND circuits 201 and 202 producing a pulse which goes to "1" at the angular position $M_1$ and goes to "0" at the angular position $M_3$ as shown by (e) in FIG. 5. On the other hand, the collector signals of the transistors 107 and 108 are applied to the flip-flop circuit 310 so that the flip-flop circuit 310 generates at its output d a pulse which goes to "1" at the angular position $M_1$ and goes to "0" at the angular position $M_2$ as shown by (d) in FIG. 5. As shown by (f) in FIG. 5, the trigger signal generating circuit 320 generates in response to the pulse signal d of the flip-flop 310 a positive trigger at the angular position $M_1$ and a negative trigger at the angular position $M_2$. On the other hand, when the pulse signal d of the flip-flop circuit 310 goes to the "1" level, the transistor 332 of the constant current circuit 330 is turned on so that the transistor 336 is turned on and its base potential is maintained constant by the action of the Zener diode 334 also maintaining its emitter potential constant. Consequently, the constant current circuit 330 supplies to the collector of the transistor 336 a constant current determined by the resistor 335. On the other hand, when the pulse signal d of the flip-flop circuit 310 goes to the "0" level, the transistor 332 is turned off so that the Zener diode 334 remains inoperative and the transistor 336 is turned off. In other words, the constant current circuit 330 generates the constant current output when the pulse signal d of the flip-flop circuit 310 is held at the "1" level (the time period between the angular positions $M_1$ and $M_2$). In the monostable multivibrator circuit 340, a current corresponding to the operating conditions of the engine is always supplied to the capacitor 344 from the engine-condition current generator 400 so that the transistor 349 is turned on by this power through the diode 345 and its collector potential i goes to the "0" level turning the transistor 342 off. In this condition, the capacitor 344 is charged by the constant current from the constant current circuit 330 during the time period between the angular positions $M_1$ and $M_2$ causing the potential at one end g of the capacitor 344 to rise linearly as shown by (g) in FIG. 5 and the charging of the capacitor 344 is terminated at the time of the angular position $M_2$ at which the base potential of the transistor 349 is decreased by a negative trigger from the trigger signal generating circuit 320 turning off the transistor 349. When this occurs, a base current is supplied to the base of the transistor 342 from the battery 20 through the resistors 347 and 346 and the transistor 342 is turned on. Consequently, the potential at one end g of the capacitor 344 is rapidly reduced to "0" through the diode 343 with the result that the potential at the other end h of the capacitor 344 drops to a negative potential by an amount corresponding to the terminal voltage $V_c$ of the capacitor 344 as shown by (h) in FIG. 5, after which by virtue of the discharge (the charging in the opposite direction) by the current from the engine-condition current generator 400 the potential gradually restores and the transistor 349 is eventually turned on again. In other words, the monostable multivibrator circuit 340 generates at its output i a monostable pulse which goes to the "1" level during the discharging period of the capacitor 344 as shown by (i) in FIG. 5. In this case, if the operating conditions of the engine are constant so that the current (discharging current) from the engine-condition current generator 400 is constant, the angular position at which the discharge is terminated remains constant independently of the rotational speed of the engine, whereas the angular position at which the discharge terminates is advanced as the discharging current increases and the same angular position is retarded as the discharging current decreases. On the other hand, since the ignition timing is generally advanced in relation to the top dead center T of the crankshaft at higher engine speeds than at lower engine speeds, the discharging current from the engine-condition current 400 is reduced at the lower engine speeds and it is increased as the engine rotational speed increases. Consequently, when, at the lower engine speeds, the discharging of the capacitor 344 has not been completed at the time of the angular position $M_3$ as shown by (i h) in FIG. 5, the transistor 204 of the low-speed revolution control circuit 200 is turned on by the pulse signal $e$ from the low-speed revolution circuit 200 and the capacitor 344 is rapidly discharged through the transistor 204 and the resistor 203 as shown at P in the waveform (h) in FIG. 5. On the other hand, the pulse signal $e$ of the low-speed revolution control circuit 200 and the monostable pulse $i$ of the monostable multivibrator circuit 340 are applied to the AND circuit 350 so that the ignition timing computing circuit 300 generates at its output $j$ a pulse signal such as shown by (j) in FIG. 5 and a point $S_1$ at which the pulse signal $j$ goes to "0" or the angular position $M_3$ is selected as the desired ignition point or timing causing the ignition means 500 to ignite the engine. At the higher engine speeds, the discharging current from the engine-condition current generator 400 increases so that the discharging of the capacitor 344 is completed at a point advanced in relation to the angular position $M_3$ and this termination point $S_2$ is selected as the ignition timing. In other words, the ignition timing is fixed at the point of the angular position $M_3$ during the low speed operation of the engine and the ignition timing is gradually advanced in relation to the point of the angular position $M_3$ as the engine speed increases.

The system according to the above-described first embodiment may be summarized as follows. The system comprises the angular position detecting means 100 for detecting first, second and third different angular positions $M_1$, $M_2$ and $M_3$ of the engine crackshaft in the direction of the rotation thereof, the ignition timing computing circuit 300 for selecting the ignition timing by the charging and discharging method of the capacitor 344, the engine-condition current generator 400 for supplying a current corresponding to the operating conditions of the engine, the low-speed revolution control circuit 200 for controlling so that at the lower engine speeds the output ignition timing signal of the ignition timing computing circuit 300 corresponds to the third angular position $M_3$ and the ignition means 500 for accomplishing the ignition in accordance with the output signal of the ignition timing computing circuit 300 and consequently at the lower engine speeds the third angular position $M_3$ is selected as the desired ignition timing and at the higher engine speeds the point at which is completed the discharging of the capacitor 344 of the ignition timing computing circuit 300 is selected as the desired ignition timing. In this case, it is possible to forcibly select the point of the third angular position $M_3$ as the ignition timing by reducing the discharging circuit from the engine-condition current generator 400 in such a manner that even if the capacitor 344 has been saturated in the course of the charging process at the lower engine speeds, the discharge is completed at a point retarded in relation to the third angular position $M_3$. On the other hand, the range of higher engine speeds where the end point of the discharging of the capacitor is selected as the desired ignition timing may for example be limited to a range of 1000 to 6000 rpm to reduce variations of the engine rotational speeds and it is possible to adjust the ignition timing with improved accuracy by increasing as far as possible the current supplied by the constant current circuit 330 for charging the capacitor 344. Further, while, a system may be used in which the lower rotational speeds are discriminated from other rotational speeds to use different charging and discharging currents, this system necessitates the switching between the low speed operation and other speed operation and this results in instable ignition timing at the switching point due to hunting of the ignition timing upon switching and the like. On the contrary, the first embodiment of the invention is designed so that at the lower engine speeds the ignition is forcibly caused at the angular position $M_3$ through the low-speed revolution control circuit 200 and in this way a smooth and stable transition from the ignition timing correct for the lower engine speeds to those correct for the higher engine speeds is ensured.

Figure 6:
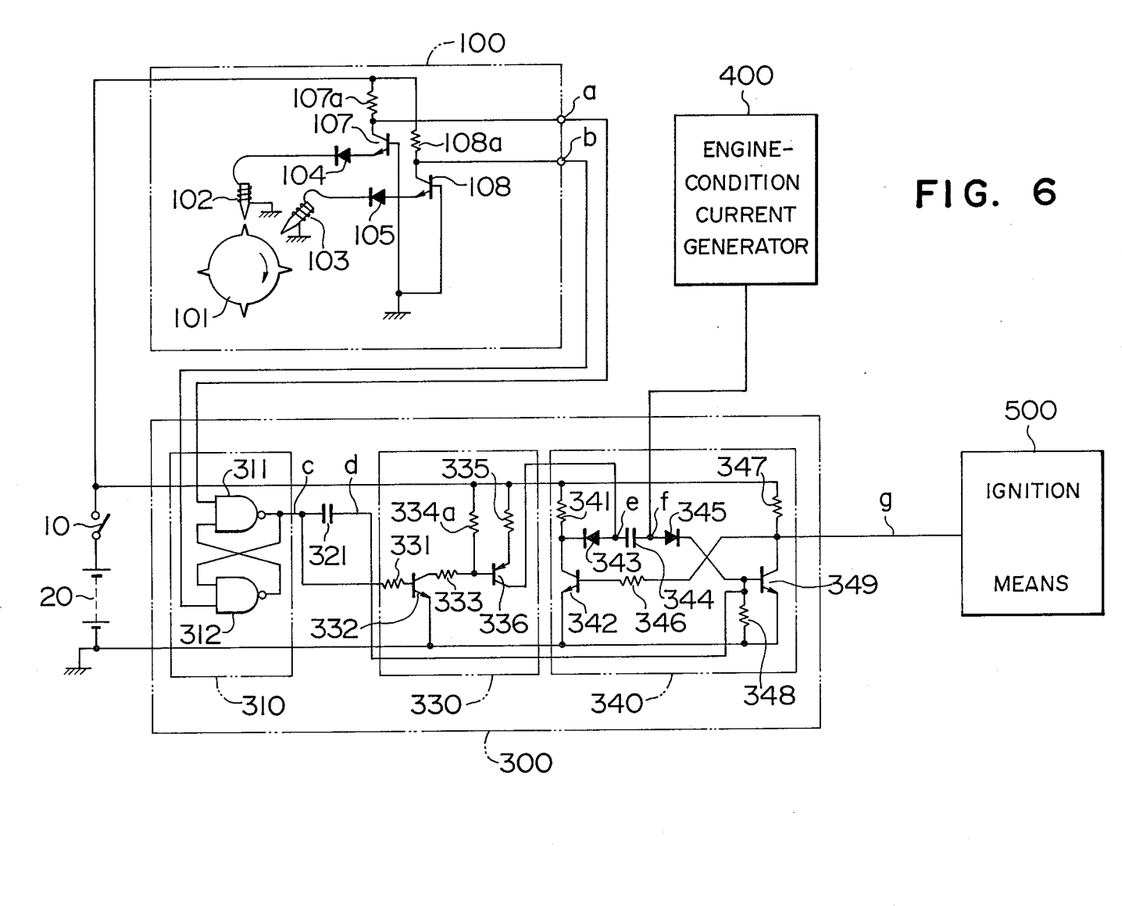
FIG. 6 is a wiring diagram showing a second embodiment of the system according to this invention.
Figure 7:
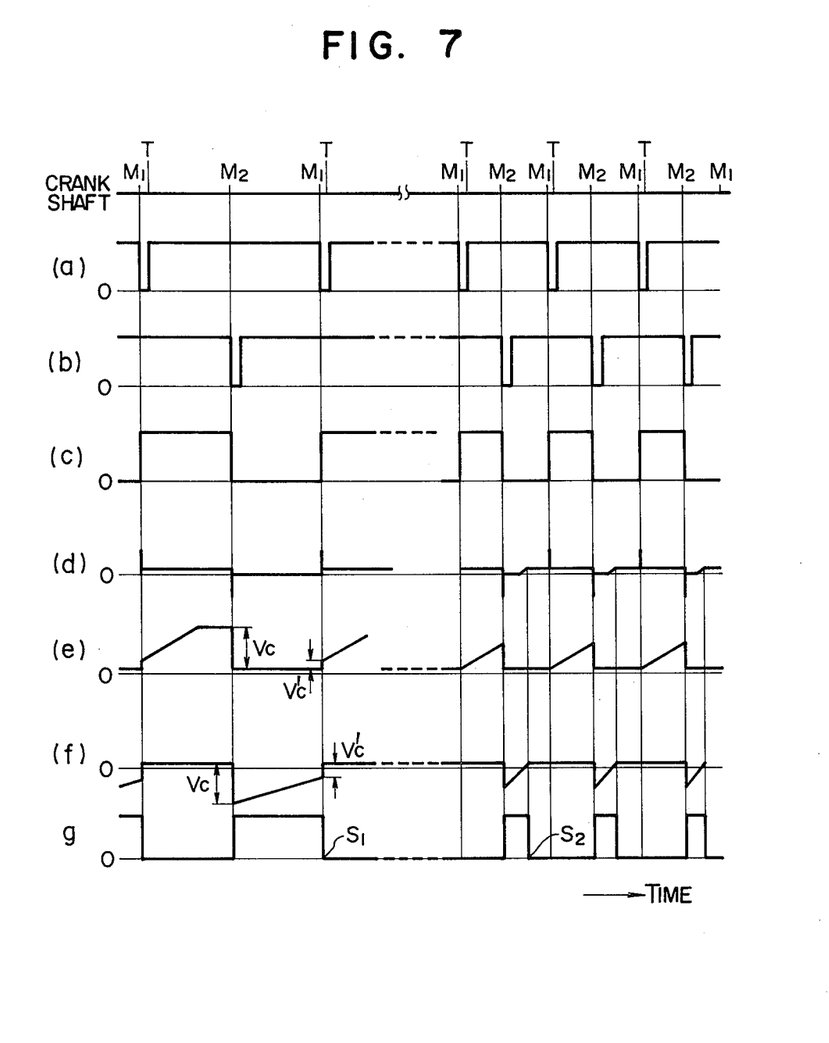
FIG. 7 is a signal waveform diagram useful for explaining the operation of the system of this invention shown in FIG. 6.

Referring now to FIG. 6, a second embodiment of the invention will be described. The second embodiment differs from the first embodiment in that the third electromagnetic pickup 103a, the diode 106 and the transistor 109 of the angular position detecting means 100, the low-speed revolution control circuit 200 and the AND circuit 350 are eliminated and a differentiating capacitor 321 is used in place of the trigger signal generating circuit 320. The collector of the transistor 349 of the monostable multivibrator circuit 340 is directly connected to the ignition means 500. In this second embodiment, the flip-flop 310, the capacitor 321 and the monostable multivibrator circuit 340 constitute an ignition timing selection circuit. With the construction described, the operation of the second embodiment will now be described with reference to the signal waveforms shown in FIG. 7. The rotor 101 is rotated in the direction of an arrow in FIG. 6 in synchronism with the rotation of the crankshaft so that each time any projection on the rotor 101 passes the electromagnetic pickups 102 and 103, respectively, each of the electromagnetic pickups 102 and 103 generates a signal which goes from positive to negative. Consequently, the electromagnetic pickups 102 and 103 detect first and second rotational angular positions $M_1$ and $M_2$ of the crankshaft. Since the base of the transistor 107 is grounded, when the output of the electromagnetic pickup 102 goes to the positive level the transistor 107 is turned off generating a "1" level signal at the collector of the traisistor 107 as shown in FIG. 7a, whereas when the output of the electromagnetic pickup 102 goes to the negative level the transistor 107 is turned on generating a "0" level signal at the collector of the transistor 107 as shown in FIG. 7a. The transistor 108 operates in the similar manner and thus the signals are generated at the collectors of the transistors 107 and 108 which respectively go from the "1" to "0" level at the points of the two different angular positions $M_1$ and $M_2$ of the crankshaft as shown by (a) and (b) in FIG. 7, respectively. The collector signals of the transistors 107 and 108 are applied to the flip-flop circuit 310 which in turn generates at its output a pulse signal which goes to the "1" level at the angular position $M_1$ and goes to the "0" level at the angular position $M_2$ as shown by (c) in FIG. 7. In response to the pulse signal c from the flip-flop circuit 310 the differentiating capacitor 321 generates a positive trigger at the angular position $M_1$ and a negative trigger at the angular position $M_2$ as shown by (d) in FIG. 7. On the other hand, when the pulse signal c from the flip-flop circuit 310 goes to the "1" level, the transistor 332 of the constant current circuit 330 is turned on and the transistor 336 is turned on. Consequently, a current flows through the resistors 333 and 334a and the base potential of the transistor 336 is maintained constant at the value of the divided potential by the resistors 334a and 333. When this occurs, the emitter potential of the transistor 336 is also maintained constant with the result that the constant current generating circuit 330 supplies to the collector of the transistor 336 a constant current which is determined by the resistor 335. On the other hand, when the pulse signal c from the flip-flop circuit 310 goes to the "0" level, the transistor 332 is turned off and the transistor 336 is also turned off. In other words, the constant current circuit 330 generates a constant current during the time that the pulse signal c from the flip-flop circuit 310 is at the "1" level (the time period between the angular positions $M_1$ and $M_2$). In the monostable multivibrator circuit 340, a current corresponding to the operating conditions of the engine is always supplied to the capacitor 344 from the engine-condition current generator 400 so that the transistor 349 is turned on by this current through the diode 345 and the collector potential g of this transistor 349 goes to the "0" level turning off the transistor 342. In this condition, the capacitor 344 is charged by the constant current from the constant current circuit 330 during the time period between the angular positions $M_1$ and $M_2$ and the potential at one end e of the capacitor 344 rises linearly as shown by (e) in FIG. 7. The charging of the capacitor 344 terminates at the point of the angular position $M_2$ and the base potential of the transistor 349 is reduced by a negative trigger from the differentiating capacitor 321 turning off the transistor 349. When this occurs, a base current is supplied to the transistor 342 through the resistors 347 and 346 and the transistor 342 is turned on. Consequently, the potential at one end e of the capacitor 344 is rapidly reduced to "0" by way of the diode 343 and thus the potential at the other end f of the capacitor 344 drops to a negative potential by an amount corresponding to the terminal voltage $V_c$ of the capacitor 344 as shown by (f) in FIG. 7, after which the discharge (the charging in the opposite direction) is effected with the current from the engine-condition current generator 400 and the potential gradually restores eventually turning on the transistor 349 again. In other words, the monostable multivibrator circuit 340 generates at its output g a monostable pulse which remains at the "1" level as shown by (g) in FIG. 7 during the time that the capacitor 344 is discharging. In this case, if the operating conditions of the engine are constant and thus the current (discharging current) from the engine-condition current generator 400 is constant, the charging current of the capacitor 344 is also constant and the angular position at which the discharge terminates is constant independently of the rotational speed of the engine. Thus, the angular position at which the discharge terminates is advanced as the discharging current increases, while the same angular position is retarded as the discharging current decreases. On the other hand, since the ignition timing is generally advanced in relation to the top dead center T of the crankshaft at the higher engine speeds than at the lower engine speeds, the discharging current from the engine-condition current generator 400 is reduced at the lower engine speeds, while the same discharging current is increased as the engine speed increases. At the lower engine speeds, as shown by (f) in FIG. 7, the discharge has not been completed at the point of the angular position $M_1$. In this case, the base potential of the transistor 349 rises at the point of the angular position $M_1$ in response to a positive trigger generated from the differentiating capacitor 321 as shown by (d) in FIG. 7 and the transistor 349 is turned on. Consequently, the transistor 342 is turned off and the potentials at the ends e and f of the capacitor 344 are varied by an amount corresponding to a terminal voltage $V'_c$ as shown by (e) and (f) in FIG. 7. In this case, the potential at one end e of the capacitor 344 does not exceed the base potential of the transistor 336 in the constant current circuit 330 but it is saturated and thus the amount of the falling potential $V_c$ at the terminal f of the capacitor 344 is always maintained constant. Consequently, by reducing the discharging current to a sufficiently small value so that at the lower engine speeds the discharging is not terminated before the angular position $M_1$ as shown by the dot-and-dash line in FIG. 9B (the time bases of FIGS. 9A and 9B correspond to each other), the ignition timing computing circuit 300 generates at its output g a pulse signal which goes to the "0" level at the time of the angular position $M_1$ and consequently the point at which the pulse signal g goes to the "0" level (i.e., a point $S_1$ in the waveform (g) in FIG. 7) is selected as the desired ignition point or timing and the ignition means 500 effects the ignition accordingly. At the higher engine speeds, the discharging current is increased with the result that the discharge is terminated at a point advanced in relation to the angular position $M_1$ and this termination point is selected as the desired ignition timing (a point $S_2$ in the waveform (g) in FIG. 7). In other words, at the lower engine speeds below $N_2$ in FIG. 8 (e.g., $N_1$), the ignition timing is maintained constant at the point of the angular position $M_1$ and the ignition timing is gradually advanced in relation to the point of $M_1$ as the engine speed exceeds $N_2$ (e.g., $N_3$).

Figure 8:
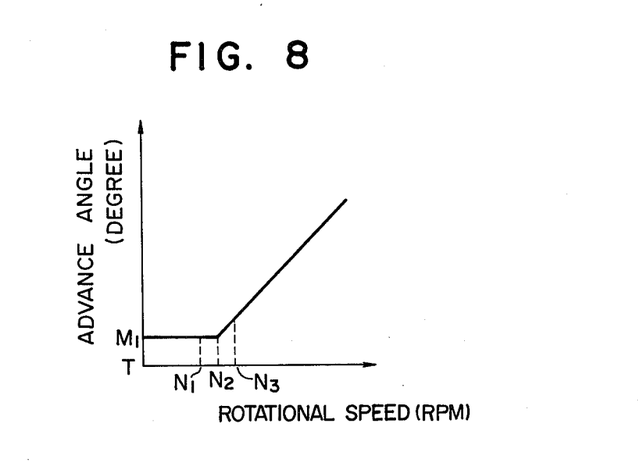
FIG. 8 is an engine rotational speed-ignition advance characteristic diagram useful for explaining the operation of the system of this invention shown in FIG. 6.
Figure 9A:
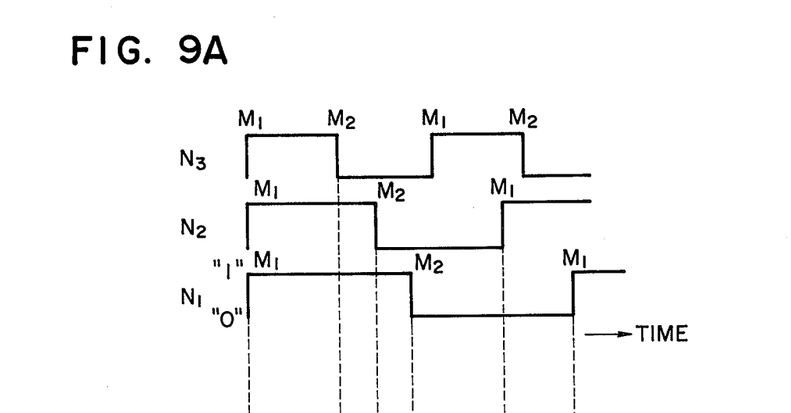
FIGS. 9A and 9B are time charts useful for explaining the operation of the system of this invention shown in FIG. 6.
Figure 9B:
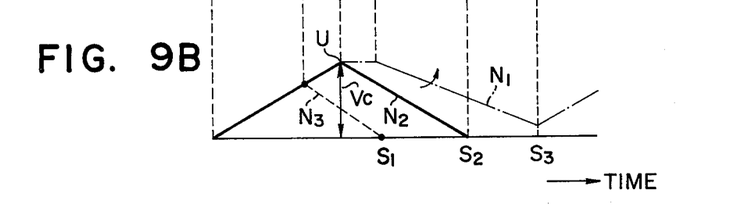

The system according to the above-described second embodiment may be summarized as follows. With the construction substantially similar to that of the conventional system, the ignition timing computing circuit 300 is modified in such a manner that at the lower rotational speeds of an internal combustion engine the ignition is timed to occur at the point of the angular position $M_1$, whereas at the higher engine rotational speeds the ignition timing is adjusted by a method of charging and discharging the capacitor 344. FIG. 8 shows an exemplary ignition advance characteristic (advance angles of the ignition timing in relation to the top dead center T) of the second embodiment with the engine rotational speed as a parameter. Namely, with the engine rotational speeds $N_1$, $N_2$ and $N_3$, the ignition is timed to occur at the point of the angular position $M_1$ for the rotational speeds up to $N_2$ and the ignition timing is advanced in relation to the angular position $M_1$ at the rotational speeds higher than $N_2$. FIG. 9 shows the manner in which the ignition timing is computed for the three cases where the rotational speed is $N_1$, $N_2$ and $N_3$, respectively. FIG. 9A shows the rectangular waveforms in the three cases each of which goes to the "1" level at the angular position $M_1$ and goes to the "0" level at the angular position $M_2$, and the capacitor 344 is charged at the "1" level of the waveforms and is discharged at the "0" level of the waveforms as shown in FIG. 9B. In this case, the charging current by the constant current circuit 330 is determined in such a manner that the terminal voltage $V_c$ of the capacitor 344 is saturated as shown at U in FIG. 9B when the rotational speed is $N_2$ and the discharging current by the engine-condition current generator 400 is determined so that the time of termination of the discharge coincides with the angular position $M_1$. In other words, the ignition is timed to occur at the angular position $M_1$. In this condition, when the rotational speed reaches $N_1$ the terminal voltage of the capacitor 344 is in saturation and constant causing the charging action as shown by the dot-and-dash line in FIG. 9B and the discharging current is sufficiently reduced as shown by the dot-and-dash line in FIG. 9B to prevent the discharging from terminating before the angular position $M_1$ thus forcibly timing the ignition to occur at the point of the angular position $M_1$. When the rotational speed reaches $N_3$, the discharging current is increased as shown by the broken line in FIG. 9B to time the ignition to occur at the point $S_1$ at which the discharge terminates. In other words, in this second embodiment the charging current from the constant current circuit 330 is determined so that the terminal voltage $V_c$ is saturated at the rotational speed $N_2$, at the lower rotational speeds below $N_2$ the discharging current from the engine-condition current generator 400 is reduced sufficiently to prevent the discharge from terminating at a point before the angular position $M_1$, and at the higher rotational speeds above the rotational speed $N_2$ the discharging current from the engine-condition current generator 400 is varied in accordance with the operating conditions of the engine, whereby the ignition is forcibly timed to occur at the angular position $M_1$ when the discharge does not terminate before the angular position $M_1$.

While, in the embodiments of this invention described above, the angular position detecting means 100 comprises electromagnetic pickups, the angular position detecting means 100 may be composed of light elements or mechanical contacts.

Further, while, in the above-described second embodiment, it is set so that the terminal voltage $V_c$ of the capacitor 344 is saturated at the rotational speed $N_2$, it is possible to set so that the terminal voltage $V_C$ is saturated at any rotational speed below $N_2$ to provide constant ignition timing, although the accuracy of ignition timing at the higher rotational speeds will be deteriorated as the rotational speed at which the terminal voltage starts to saturate is decreased.

What we claim is:

1. An electronic ignition timing adjusting system for an internal combustion engine comprising:
    angular position detecting means for detecting two different angular positions of the crankshaft of an engine to generate a first detection signal at one end of said two angular positions and a second detection signal at the other of said two angular positions which is preset to correspond to a minimum ignition advance angular position;
    a capacitor;
    charging means for charging said capacitor during a period from the generation of said second detection signal until the generation of said first detection signal;
    discharging means for beginning to discharge said capacitor upon generation of said first detection signal;
    engine condition detecting means for detecting at least the rotational speed of said engine to control either one of a charging current and a discharging current of said capacitor in accordance with at least the rotational speed so that discharging of said capacitor is completed in a shorter period as said rotational speed becomes higher;
    discharge completing means for forcibly completing the discharging of said capacitor in response to the generation of said second detection signal when the discharging of said capacitor has not been completed upon the generation of the same; and
    ignition signal generating means for generating an ignition signal when the discharging of said capacitor has been completed, whereby ignition advance angular position is determined to coincide with said minimum ignition advance angular position when said rotational speed is lower than a predetermined value and to become greater than said minimum ignition advance angular position as said rotational speed becomes higher than said predetermined value.

2. A system according to claim 1, wherein said ignition signal generating means includes a first transistor having the base thereof connected to said capacitor and said angular position detecting means, whereby said first transistor is turned on when the discharging of said capacitor has been completed.

3. A system according to claim 2, wherein said discharging means includes a second transistor connected to said first transistor, said capacitor and said charging means, whereby when said first transistor is turned off, said second transistor is turned on to discharge said capacitor in accordance with the discharging current controlled by said engine condition detecting means.

4. A system according to claim 3, wherein said charging means includes:
    a constant current circuit connected to said angular position detecting means and said capacitor for charging said capacitor with a predetermined constant current during the time period between the generation of said first detection signal and the generation of said second detection signal from said angular position detecting means.

5. A system according to claim 1, wherein said charging means includes a flip-flop circuit arranged to be set and reset in response to said first and second detection signals generated from said angular position detecting means, and a first charging current circuit;
    wherein said ignition signal generating means includes a monostable multivibrator for determining ignition timing, said monostable multivibrator having a first transistor having the base thereof connected to said flip-flop circuit to be turned on in response to the generation of an output from said flip-flop circuit upon setting thereof, and a second transistor having the base thereof connected to the collector of said first transistor so that said second transistor is turned off when said first transistor is turned on, said capacitor connected between the base of said first transistor and the collector of said second transistor, said first charging current circuit being connected to one terminal of said capacitor connected to the collector of said second transistor for charging said capacitor with a given charing current from one direction through the base of said first transistor in response to the conduction thereof; and wherein said engine condition detecting means includes a second charging current circuit connected to the other terminal of said capacitor connected to the base of said first transistor for charging said capacitor with a given charging current from the other direction through the collector of said second transistor in response to the conduction thereof and turning said first transistor on when the voltate on said capacitor reaches a predetermined value.

6. A system according to claim 5, wherein said charging means further comprises switching means connected to said monostable multivibrator and said flip-flop circuit for preventing the application of the charging current from said charging means to said monostable multivibrator in response to the generation of an output from said flip-flop circuit upon resetting thereof.

* * * * *